United States Patent
Chen et al.

(10) Patent No.: US 10,320,556 B2
(45) Date of Patent: Jun. 11, 2019

(54) METHOD, MOBILE TERMINAL, DEVICE, AND READABLE STORAGE MEDIUM FOR PREVENTING ACCESSED DATA FROM BEING TAMPERED WITH

(71) Applicant: PING AN TECHNOLOGY (SHENZHEN) CO., LTD., Shenzhen (CN)

(72) Inventors: Jianwei Chen, Shenzhen (CN); Huiling Cao, Shenzhen (CN)

(73) Assignee: PING AN TECHNOLOGY (SHENZHEN) CO., LTD., Shenzhen (CN)

(*) Notice: Subject to any disclaimer, the term of this patent is extended or adjusted under 35 U.S.C. 154(b) by 14 days.

(21) Appl. No.: 15/736,364

(22) PCT Filed: Jan. 23, 2017

(86) PCT No.: PCT/CN2017/072298
§ 371 (c)(1),
(2) Date: Dec. 14, 2017

(87) PCT Pub. No.: WO2017/129103
PCT Pub. Date: Aug. 3, 2017

(65) Prior Publication Data
US 2018/0183575 A1 Jun. 28, 2018

(30) Foreign Application Priority Data
Jan. 25, 2016 (CN) .......................... 2016 1 0051037

(51) Int. Cl.
*H04L 9/06* (2006.01)
*H04W 12/04* (2009.01)
(Continued)

(52) U.S. Cl.
CPC .......... *H04L 9/0618* (2013.01); *H04L 9/3228* (2013.01); *H04L 63/0428* (2013.01);
(Continued)

(58) Field of Classification Search
USPC ......................................... 713/189, 193, 194
See application file for complete search history.

(56) References Cited

U.S. PATENT DOCUMENTS 6,845,383 B1* 1/2005 Kraenzel ................. G06F 21/31
8,549,326 B2* 10/2013 Mohamed ........... G06F 21/6218
713/193

(Continued)

FOREIGN PATENT DOCUMENTS

| CN | 102917348 A | 2/2013 |
| CN | 103488918 A | 1/2014 |
| CN | 104168116 A | 11/2014 |

*Primary Examiner* — Jahangir Kabir
(74) *Attorney, Agent, or Firm* — Gokalp Bayramoglu

(57) ABSTRACT

Disclosed are a method, a mobile terminal, a device, as well as a readable storage medium for preventing accessed data from being tampered with. The mobile terminal can: receive a data server access instruction triggered by a user for an application on the mobile terminal, and acquire from the data server a corresponding configuration file of the application and a version control file carrying verification ciphertext; encrypt the acquired configuration file according to a preset encryption method to obtain a corresponding first encrypted value of the configuration file; extract the verification ciphertext from the acquired version control file and decrypt the verification ciphertext to obtain a corresponding plaintext encrypted value; and analyze the consistency between the first encrypted value and the plaintext encrypted value and finally allow the application to access the corresponding accessed data when determining the first encrypted value and the plaintext encrypted value are consistent.

12 Claims, 6 Drawing Sheets

(51) Int. Cl.
  *H04L 29/06* (2006.01)
  *H04W 12/08* (2009.01)
  *H04W 12/12* (2009.01)
  *H04W 88/02* (2009.01)
  *H04L 9/32* (2006.01)
  *H04W 12/02* (2009.01)

(52) U.S. Cl.
  CPC ........... *H04L 63/123* (2013.01); *H04W 12/04* (2013.01); *H04W 12/08* (2013.01); *H04W 12/12* (2013.01); *H04W 88/02* (2013.01); *H04L 63/0442* (2013.01); *H04L 63/10* (2013.01); *H04L 63/1425* (2013.01); *H04L 2209/80* (2013.01); *H04W 12/02* (2013.01)

(56) References Cited

U.S. PATENT DOCUMENTS

| | | | | |
|---|---|---|---|---|
| 2007/0168680 | A1* | 7/2007 | Jonas | G06F 21/64 |
| | | | | 713/194 |
| 2008/0244754 | A1* | 10/2008 | Curren | G06F 21/10 |
| | | | | 726/27 |
| 2014/0040638 | A1* | 2/2014 | Barton | H04L 41/00 |
| | | | | 713/193 |
| 2016/0269376 | A1* | 9/2016 | Goyal | H04L 63/0492 |
| 2017/0147313 | A1* | 5/2017 | Casciano | G06F 8/61 |
| 2018/0067917 | A1* | 3/2018 | Brisebois | G06F 17/243 |

\* cited by examiner

METHOD, MOBILE TERMINAL, DEVICE, AND READABLE STORAGE MEDIUM FOR PREVENTING ACCESSED DATA FROM BEING TAMPERED WITH

CROSS REFERENCE OF RELATED APPLICATIONS

The present application is the national phase entry of international application no. PCT/CN2017/072298, filed on Jan. 23, 2017, which claims the benefit of priority from Chinese Application No. 201610051037.6, filed on Jan. 25, 2016, the entire content of which is incorporated herein in its entirety.

TECHNICAL FIELD

This disclosure generally relates to the field of data processing technology, and more particularly relates to a method, a mobile terminal, a device, as well as a readable storage medium for preventing accessed data from being tampered with.

BACKGROUND

In this era of information explosion, as data processing technology continues to develop and in view of the limitations of mobile terminals, applications (app's) on mobile terminals have evolved from native apps to hybrid apps and then to web apps. This series of changes are due to technical updates and demands of the market.

As the mobile-side hybrid development technology becomes prevalent, the off-line caching technology has also been widely used. But on problems of network traffic hijacking, illegal file tampering, and other data security issues, an agreed security strategy has not yet been reached in the industry. The current typical security strategy is the secure sockets layer (SSL) strategy applied to the entire network communication layer—i.e., the HTTPS, short for hypertext transfer protocol over secure socket layer—which uses ciphertext transmission, so as to tunnel the network communications. But considering the existing security vulnerabilities of the SSL itself, which may lead to a complete failure of this security strategy, defense relying solely on SSL would not be sufficient to solve the security issues related with the offline cached data.

SUMMARY

In view of the above, there is a need to provide a method, a mobile terminal, a device, and a readable storage medium for preventing accessed data from being tampered with, aiming at improving the security of offline cached accessed data thus preventing the accessed data from being tampered with.

There is disclosed a method for preventing accessed data from being tampered with, the method including the following operations. A mobile terminal receives a data server access instruction triggered by a user for an application on the mobile terminal, and acquires from the data server a corresponding configuration file of the application and a version control file carrying verification ciphertext. The mobile terminal then encrypts the acquired configuration file according to a preset encryption method to obtain a corresponding first encrypted value of the configuration file. Then from the acquired version control file the mobile terminal extracts the verification ciphertext and decrypts the extracted verification ciphertext to obtain a corresponding plaintext encrypted value of the verification ciphertext. The mobile terminal analyzes the consistency between the first encrypted value and the plaintext encrypted value, and then allows the application to access the corresponding accessed data when the first encrypted value and the plaintext encrypted value are consistent.

There is also disclosed a mobile terminal that includes: an acquisition module that receives a data server access instruction triggered by a user for an application, and acquires from the data server a corresponding configuration file of the application and a version control file carrying verification ciphertext; an encryption module that encrypts the acquired configuration file according to a preset encryption method to obtain a corresponding first encrypted value of the configuration file; a decryption module that extracts the verification ciphertext from the acquired version control file and decrypts the extracted verification ciphertext to obtain a corresponding plaintext encrypted value of the verification ciphertext; and an analysis module that analyzes the consistency between the first encrypted value and the plaintext encrypted value and allows the application to access the corresponding accessed data when determining the first encrypted value and the plaintext encrypted value are consistent.

There is further disclosed a device for preventing accessed data from being tampered with, the device including a processing unit, as well as a system for preventing accessed data from being tampered with, an input/output unit, a communication unit, and a storage unit that are coupled to the processing unit.

The input/output unit is used for inputting a user instruction and outputting response data of the device for preventing accessed data from being tampered with to the input user instruction.

The communication unit is used for communicative connection with a mobile terminal or a background server.

The storage unit is used for storing the system for preventing accessed data from being tampered with as well as operating data of the system.

The processor unit is configured to execute the system for preventing accessed data from being tampered with, in order to cause the device to perform the following operations: receiving a data server access instruction triggered by a user for an application on a mobile terminal, and acquiring from the data server a corresponding configuration file of the application and a version control file carrying verification ciphertext; encrypting the acquired configuration file according to a preset encryption method to obtain a corresponding first encrypted value of the configuration file; extracting from the acquired version control file the verification ciphertext and decrypting the extracted verification ciphertext to obtain a corresponding plaintext encrypted value of the verification ciphertext; and allowing the application to access the corresponding accessed data, when determining that the first encrypted value and the plaintext encrypted value are consistent.

There is yet further disclosed a computer-readable storage medium storing one or more programs, which can be executed by one or more processors to perform the following operations: receiving a data server access instruction triggered by a user for an application on a mobile terminal, and acquiring from the data server a corresponding configuration file of the application and a version control file carrying verification ciphertext; encrypting the acquired configuration file according to a preset encryption method to obtain a corresponding first encrypted value of the configuration file; extracting from the acquired version control file the verification ciphertext and decrypting the extracted verification ciphertext to obtain a corresponding plaintext encrypted value of the verification ciphertext; and allowing the application to access the corresponding accessed data, when determining the first encrypted value and the plaintext encrypted value are consistent.

The method, mobile terminal, device, together with the readable storage medium for preventing accessed data from being tampered with that are provided by this disclosure can bring the following benefits.

The mobile terminal can: receive a data server access instruction triggered by a user for an application on the mobile terminal, and acquire from the data server a corresponding configuration file of the application and a version control file carrying verification ciphertext; encrypt the acquired configuration file according to a preset encryption method to obtain a corresponding first encrypted value of the configuration file; extract the verification ciphertext from the acquired version control file and then decrypt the extracted verification ciphertext to obtain a corresponding plaintext encrypted value of the verification ciphertext; analyze the consistency between the first encrypted value and the plaintext encrypted value, and finally allow the application to access the related accessed data when the first encrypted value and the plaintext encrypted value are consistent. Thus, the security of the offline cached accessed data is improved and the risk of the accessed data being tampered with is reduced; in addition, the security of accessing with an application is also enhanced. Furthermore, the mobile terminal can encrypt the accessed data while constructing the accessed data, effectively preventing the security risk of the accessed data being tampered with after the construction, thus further improving the security of the accessed data.

Objects, functional features, and advantages of this disclosure will be described below in further detail in connection with embodiments and the accompanying drawings.

DETAILED DESCRIPTION OF THE INVENTION

Hereinafter technical solutions of the disclosure will be described in further detail in connection with specific embodiments and the accompanying drawings. It will be appreciated that the specific embodiments described herein are merely illustrative of the disclosure and are not intended to limit the disclosure.

Figure 1:
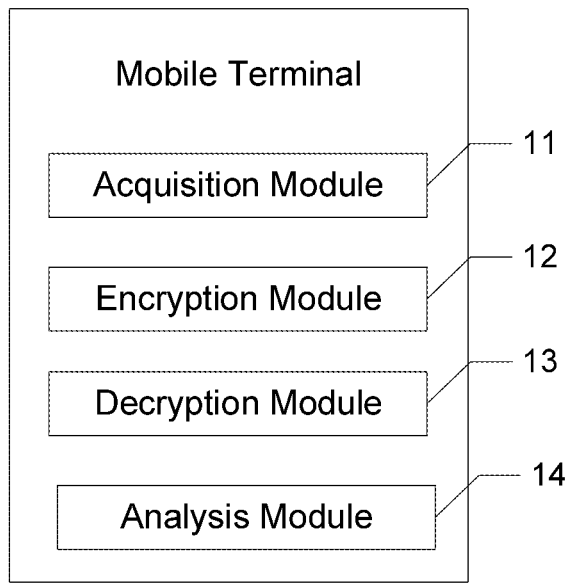
FIG. 1 is an illustrative block diagram of an embodiment of a mobile terminal according to the disclosure.

This disclosure provides a mobile terminal, as illustrated in FIG. 1. The mobile terminal includes an acquisition module 11, an encryption module 12, a decryption module 13, and an analysis module 14.

The acquisition module 11 is used for receiving a data server access instruction triggered by a user for an application on the mobile terminal, and acquiring from the data server a corresponding configuration file of the application and a version control file carrying verification ciphertext.

In various embodiments, with a mobile terminal the user can issue a data server access instruction for an application on the mobile terminal. So the acquisition module 11 of the mobile terminal may receive the data server access instruction triggered by the user for the application, and then acquire a corresponding configuration file of the application and a version control file carrying verification ciphertext, from the data server.

In a specific application scenario, for example, the user can enter a web server URL to be accessed in the address bar of the mobile terminal's browser, so as to trigger an access instruction for accessing the web server corresponding to the web server URL. In response to the web server access instruction the user triggers for the browser, the acquisition module 11 of the mobile terminal can acquire from the web server a corresponding configuration file of the browser and a version control file carrying the verification ciphertext.

The encryption module 12 is used for encrypting the acquired configuration file according to a preset encryption method to obtain a corresponding first encrypted value of the configuration file.

After the acquisition module 11 of the mobile terminal acquires the corresponding configuration file, the encryption module 12 may encrypt the configuration file according to a preset encryption method, thus obtaining the corresponding first encrypted value of this configuration file. In various embodiments, the preset encryption algorithms described supra may include without limitation: symmetric encryption algorithms and asymmetric encryption algorithms.

In an exemplary embodiment, the encryption module 12 of the mobile terminal uses message digest algorithm (MD5) to encrypt the configuration file, to obtain a corresponding first MD5 value of the configuration file.

The decryption module 13 is used for extracting the verification ciphertext from the acquired version control file and decrypting the extracted verification ciphertext to obtain a corresponding plaintext encrypted value of the verification ciphertext.

From the corresponding version control file of the application that is acquired by the acquisition module 11, the decryption module 13 of the mobile terminal can extract the corresponding verification ciphertext, and further decrypt the extracted verification ciphertext, to obtain the corresponding plaintext encrypted value of the verification ciphertext. In various embodiments, while decrypting the aforesaid verification ciphertext, the decryption module 13 may use a decryption method it negotiated in advance with the data server. For example, the decryption module 13 may decrypt the verification ciphertext using MD5 decryption to obtain the corresponding plaintext MD5 value of the verification ciphertext.

In an exemplary embodiment, when decrypting the version control file, the decryption module 13 first extracts the verification ciphertext from the version control file, and then decrypts the extracted verification ciphertext using a public key generated in advance by a key generator, to obtain the corresponding plaintext encrypted value of the verification ciphertext. Since a public key and a private key are usually in pairs, in various embodiments the public key is matched with a private key in the key pair to which the public key belongs, where the public key is prestored in a corresponding preset type file of the application. For example, the decryption module 13 may use a public key generated in advance by an RSA key generator to decrypt the verification ciphertext, and further stores the public key in the configuration file of the application.

The analysis module 14 is used for analyzing the consistency between the first encrypted value and the plaintext encrypted value and allowing the application to access the corresponding accessed data when determining the first encrypted value and the plaintext encrypted value are consistent.

Based on the corresponding first encrypted value of the configuration file that is obtained by the encryption module 12 as well as the plaintext encrypted value obtained by the decryption module 13 decrypting the verification ciphertext in the version control file, the analysis module 14 of the mobile terminal can compare the first encrypted value with the plaintext encrypted value and determine whether they are consistent. If the first encrypted value and the plaintext encrypted value are consistent, then it indicates the accessed data hasn't been tampered with, and so the mobile terminal would allow the above application to access the corresponding accessed data.

If the analysis module 14 compares the first encrypted value with the plaintext encrypted value to find they are inconsistent, then a preset operation may be performed. For example, the mobile terminal may directly reject the application access to the corresponding accessed data, or generate a reminder message allowing the user to finally determine whether to perform the accessing operation, or display a preset operating interface showing that a certain risk is entailed in the access, or directly return to the main interface of this application, and so on. In various embodiments, however, when the mobile terminal finds the first encrypted value and the plaintext encrypted value described supra are inconsistent, the particular operation to be performed by the mobile terminal will not be limited.

The mobile terminal according to this disclosure can: receive a data server access instruction triggered by a user for an application on the mobile terminal, and acquire from the data server a corresponding configuration file of this application and a version control file carrying verification ciphertext; encrypt the acquired configuration file according to a preset encryption method to obtain a corresponding first encrypted value of the configuration file; extract the verification ciphertext from the acquired version control file and then decrypt the extracted verification ciphertext to obtain a corresponding plaintext encrypted value of the verification ciphertext; analyze the consistency between the first encrypted value and the plaintext encrypted value, and finally allow the application to access the related accessed data when the first encrypted value and the plaintext encrypted value are consistent. Thus, the security of the offline cached accessed data is improved and the risk of the accessed data being tampered with is reduced, and in addition, the security of accessing with an application is also enhanced.

Figure 2:
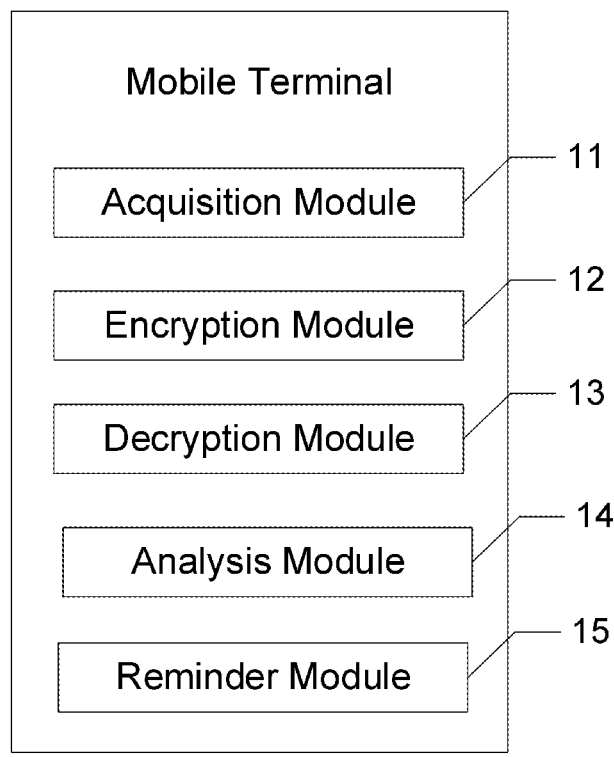
FIG. 2 is an illustrative block diagram of another embodiment of a mobile terminal according to the disclosure.

Based on the description of the embodiment shown in FIG. 1, to improve the convenience and intelligence in accessing the accessed data, the mobile terminal according to the disclosure may further include a reminder module 15, as illustrated in FIG. 2.

The reminder module 15 is used for rejecting the application access to the corresponding accessed data when analyzing the first encrypted value and the plaintext encrypted value are inconsistent. Alternatively, the reminder module 15 is used for generating a reminder message to alert the user of the risk that the accessed data to be currently accessed may have been tampered with.

In various embodiments, in order to avoid the security risk caused by accessing the accessed data which may have be tampered with, when the analysis module 14 of the mobile terminal analyzes that the first encrypted value and the plaintext encrypted value are inconsistent, the reminder module 15 would directly reject the application access to the corresponding accessed data. Alternatively, in order to avoid misinterpretation by the mobile terminal as well as not to affect the user experience, when the analysis module 14 of the mobile terminal analyzes the first encrypted value and the plaintext encrypted value are inconsistent, the reminder module 15 of the mobile terminal may generate a reminder message to alert the user that the accessed data to be currently accessed is at risk of being tampered with, so that the user can further determine whether to proceed with or reject the access.

Further, based on the description of the embodiments shown in FIGS. 1 and 2, in order to further improve the security of the accessed data and avoid the accessed data from being tampered with during the course of constructing the accessed data of the application, the mobile terminal according to this disclosure may perform a corresponding encryption operation on the accessed data while issuing the above accessed data.

Figure 3:
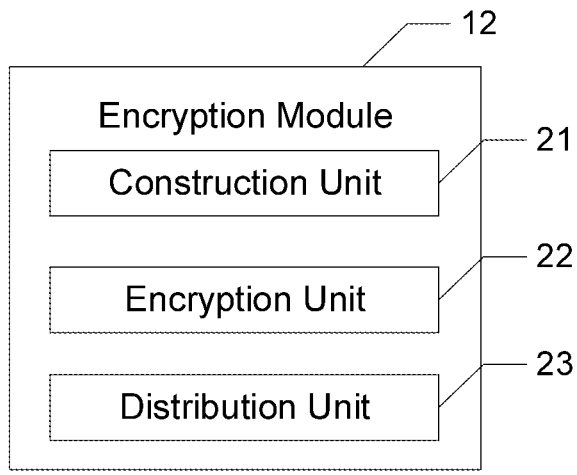
FIG. 3 is an illustrative block diagram of an implementation of encryption module 12 in a mobile terminal according to the disclosure.

In the mobile terminal according to this disclosure, as illustrated in FIG. 3, the encryption module 12 may include a construction unit 21, an encryption unit 22, and a distribution unit 23.

The construction unit 21 is used for building accessed data of the application, and encrypting the configuration file of the accessed data according to the preset encryption method, so as to obtain the corresponding plaintext encrypted value of the configuration file.

In various embodiments, in building the accessed data of an application, the construction unit 21 of the mobile terminal may directly encrypt the configuration file of the accessed data according to the preset encryption method, to obtain the corresponding plaintext encrypted value of the configuration file. The mobile terminal may use an encryption method, identical to the encryption method used to encrypt the corresponding configuration file of this application that is acquired by the mobile terminal, to encrypt the corresponding configuration file of the accessed data of the same application.

In a specific application scenario, for example, while building the browser's web page data, the webmaster's office terminal can use the MD5 encryption algorithm to perform MD5 processing on the configuration file, named manifest.json file, of the web page data, so as to obtain the corresponding second MD5 value of this configuration file.

The encryption unit 22 is used for encrypting the obtained plaintext encrypted value using the private key generated in advance by the key generator, thus obtaining the corresponding verification ciphertext of the plaintext encrypted value.

That is, the encryption unit 22 of the mobile terminal can use the private key the key generator generates in advance to re-encrypt the plaintext encrypted value obtained by encrypting the corresponding configuration file of the aforesaid application. Thus, the corresponding verification ciphertext of the plaintext encrypted value is obtained.

In various embodiments, the key generator used by the encryption unit 22 of the mobile terminal is identical to that used by the mobile terminal for the same application. In addition, the private key used by the encryption unit 22 for encrypting the plaintext encrypted value is matched with the public key used by the mobile terminal for decrypting the verification ciphertext, as a matching key pair. For example, the encryption unit 22 may use a private key generated in advance by an RSA key generator to encrypt the obtained second MD5 value, to obtain the corresponding verification ciphertext of the second MD5 value.

The distribution unit 23 is used for putting the verification ciphertext in the version control file of the accessed data and distributing the accessed data, the version control file carrying the verification ciphertext, as well as the configuration file to the data server.

In order to facilitate the mobile terminal in performing security check analysis on the accessed data to be accessed, the distribution unit 23 of the mobile terminal may put the verification ciphertext, obtained by encryption by the encryption unit 22, into the corresponding version control file of the accessed data, and further distribute all of the accessed data, the version control file carrying the verification ciphertext, as well as the corresponding configuration file of the aforesaid application to the corresponding data server. For example, the distribution unit 23 of the mobile terminal may place the encrypted verification ciphertext in the version control file, named version.json file, of the browser's corresponding web page data, and further distribute the above web page data, the version.json file carrying the verification ciphertext and the browser's corresponding configuration file, named manifest.json file, to the web server.

According to the disclosure, the mobile terminal can: build accessed data of the application and encrypt the configuration file of the accessed data according to the preset encryption method to obtain the corresponding plaintext encrypted value of the configuration file; encrypt the obtained plaintext encrypted value using the private key generated in advance by the key generator, to obtain the corresponding verification ciphertext of the plaintext encrypted value; put the verification ciphertext in the version control file of the accessed data, and further distribute the accessed data, the version control file carrying the verification ciphertext, as well as the configuration file to the data server. Thus, the disclosure brings the benefit of encrypting the accessed data while building the accessed data, effectively preventing the security risks of the accessed data being tampered with after being built, thus further improving the security of the accessed data.

In hardware implementation, the above acquisition module 11, encryption module 12, decryption module 13, and analysis module 14 may, in the form of hardware, be embedded in or independent of the device for preventing accessed data from being tampered with, or can also be stored in the form of software in a memory of the device for preventing accessed data from being tampered with so that the processor can invoke and execute the corresponding operations of the various modules described supra. The processor may be a central processing unit (CPU), a microprocessor, a single chip microcomputer (SCM), etc.

Figure 4:
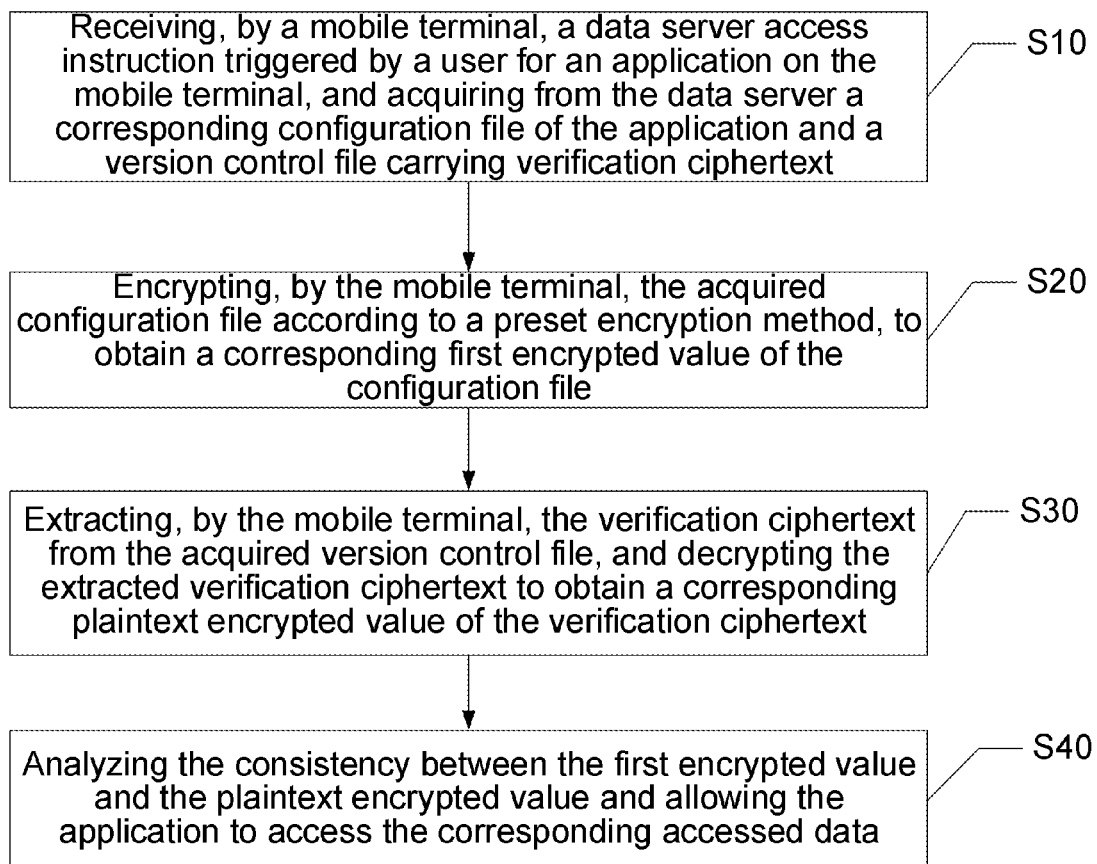
FIG. 4 is an illustrative flowchart of an embodiment of a method for preventing accessed data from being tampered with according to the disclosure.

The disclosure also provides a method of preventing accessed data from being tampered with, aiming at improving the security of offline cached accessed data and thus preventing the accessed data from being tampered with. As illustrated in FIG. 4, the method of preventing accessed data from being tampered with according to this disclosure can be implemented as the following steps S10-S40.

At step S10, a mobile terminal receives a data server access instruction triggered by a user for an application on the mobile terminal, and acquires from the data server a corresponding configuration file of this application and a version control file carrying verification ciphertext.

In various embodiments, with a mobile terminal the user can issue a data server access instruction for an application on the mobile terminal. So the mobile terminal may receive the data server access instruction triggered by the user for this application, and then acquire the corresponding configuration file of this application and the version control file carrying the verification ciphertext.

In a specific application scenario, for example, the user can enter a web server URL to be accessed in the address bar of the mobile terminal's browser, so as to trigger an access instruction for accessing the web server corresponding to the web server URL. In response to the web server access instruction the user triggers for the browser, the mobile terminal can acquire from the web server a corresponding configuration file of the browser and a version control file carrying the verification ciphertext.

At step S20, the mobile terminal encrypts the acquired configuration file according to a preset encryption method to obtain a corresponding first encrypted value of the configuration file.

After acquiring the corresponding configuration file, the mobile terminal may encrypt the configuration file according to the preset encryption method, thus obtaining the corresponding first encrypted value of this configuration file. In various embodiments, the preset encryption algorithms described supra may include without limitation: symmetric encryption algorithms and asymmetric encryption algorithms.

In an exemplary embodiment, the mobile terminal uses message digest algorithm (MD5) to encrypt the configuration file, to obtain a corresponding first MD5 value of the configuration file.

At step S30, the mobile terminal extracts the verification ciphertext from the acquired version control file and decrypts the extracted verification ciphertext to obtain a corresponding plaintext encrypted value of the verification ciphertext.

From the acquired corresponding version control file of the application, the mobile terminal can extract the corresponding verification ciphertext, and further decrypt the extracted verification ciphertext, to obtain the corresponding plaintext encrypted value of the verification ciphertext. In various embodiments, while decrypting the aforesaid verification ciphertext, the mobile terminal may use a decryption method it negotiated in advance with the data server. For example, the mobile terminal may decrypt the verification ciphertext using MD5 decryption to obtain the corresponding plaintext MD5 value of the verification ciphertext.

In an exemplary embodiment, when decrypting the version control file, the mobile terminal first extracts the verification ciphertext from the version control file, and then decrypts the extracted verification ciphertext using a public key generated by a key generator, to obtain the corresponding plaintext encrypted value of the verification ciphertext. Since a public key and a private key are usually in pairs, in various embodiments the public key is matched with a private key in the key pair to which the public key belongs, where the public key is prestored in a corresponding preset type file of the application. For example, the mobile terminal may use a public key generated in advance by an RSA key generator to decrypt the verification ciphertext, and further stores the public key in the configuration file of the application.

At step S40, the mobile terminal analyzes the consistency between the first encrypted value and the plaintext encrypted value, and then allows the application to access the corresponding accessed data.

Based on the obtained corresponding first encrypted value of the configuration file as well as the plaintext encrypted value obtained by decrypting the verification ciphertext in the version control file, the mobile terminal can compare the first encrypted value and the plaintext encrypted value to determine whether they are consistent. If the first encrypted value and the plaintext encrypted value are consistent, then it indicates the accessed data hasn't been tampered with, and so the mobile terminal would allow the above application to access the corresponding accessed data.

If the mobile terminal compares the first encrypted value with the plaintext encrypted value to find they are inconsistent, then a preset operation may be performed. For example, the mobile terminal may directly reject the application access to the corresponding accessed data, or generate a reminder message allowing the user to finally determine whether to perform the accessing operation, or display a preset operating interface showing that a certain risk is entailed in the access, or directly return to the main interface of this application, and so on. In various embodiments, when the mobile terminal finds the first encrypted value and the plaintext encrypted value described supra are inconsistent, the particular operation to be performed by the mobile terminal won't be limited.

According to the method of preventing accessed data from being tampered with, the mobile terminal can: receive a data server access instruction triggered by a user for an application on the mobile terminal, and acquire from the data server a corresponding configuration file of the application and a version control file carrying verification ciphertext; encrypt the acquired configuration file according to a preset encryption method to obtain a corresponding first encrypted value of the configuration file; extract the verification ciphertext from the acquired version control file and then decrypt the extracted verification ciphertext to obtain a corresponding plaintext encrypted value of the verification ciphertext; analyze the consistency between the first encrypted value and the plaintext encrypted value, and finally allow the application to access the related accessed data when the first encrypted value and the plaintext encrypted value are consistent. Thus, the security of the offline cached accessed data is improved and the risk of the accessed data being tampered with is reduced, and in addition, the security of accessing with an application is also enhanced.

Figure 5:
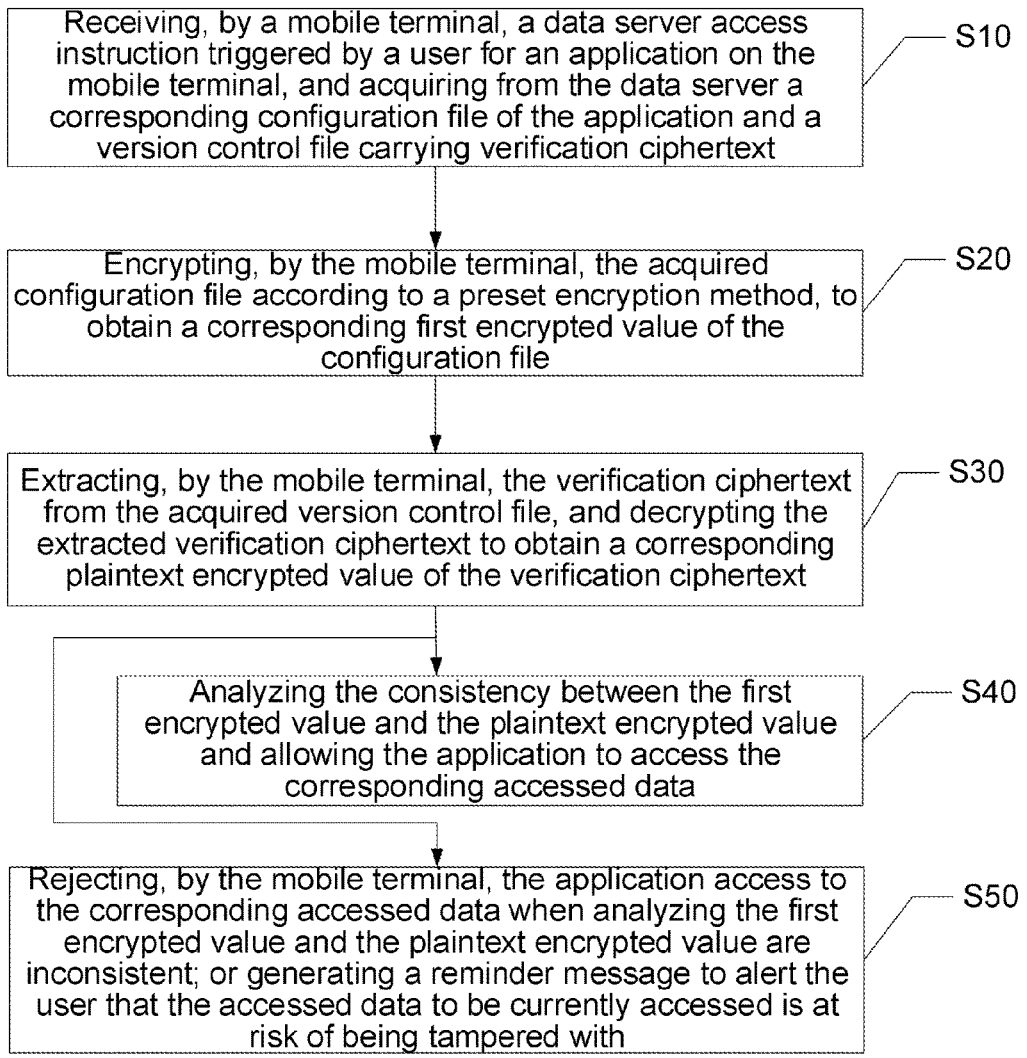
FIG. 5 is an illustrative flowchart of another embodiment of a method for preventing accessed data from being tampered with according to the disclosure.

Based on the description of the embodiment shown in FIG. 4, to improve the convenience and intelligence in accessing the accessed data, the method of preventing accessed data from being tampered with according to the disclosure may further include, as illustrated in FIG. 5, a step S50, subsequent to the step S30 "extracting, by the mobile terminal, the verification ciphertext from the acquired version control file and decrypting the extracted verification ciphertext to obtain a corresponding plaintext encrypted value of the verification ciphertext".

At step S50, the mobile terminal rejects the application access to the corresponding accessed data when analyzing the first encrypted value and the plaintext encrypted value are inconsistent. Alternatively, the mobile terminal may generate a reminder message to alert the user of the risk that the accessed data to be accessed may have been tampered with.

In various embodiments, in order to avoid the security risk caused by accessing the accessed data which may have be tampered with, when analyzing that the first encrypted value and the plaintext encrypted value are inconsistent, the mobile terminal would directly reject the application access to the corresponding accessed data. Alternatively, in order to avoid misinterpretation by the mobile terminal as well as not to affect the user experience, when the mobile terminal analyzes the first encrypted value and the plaintext encrypted value are inconsistent, the mobile terminal may generate a reminder message to alert the user that the accessed data to be currently accessed is at risk of being tampered with, so that the user can further determine whether to proceed with or reject the access.

Further, based on the description of the embodiments shown in FIGS. 4 and 5, in order to further improve the security of the accessed data and prevent the accessed data being tampered with during the course of building the accessed data of the application, in the method of preventing accessed data from being tampered with according to the disclosure, the mobile terminal may perform a corresponding encryption operation on the accessed data while issuing the above accessed data.

Figure 6:
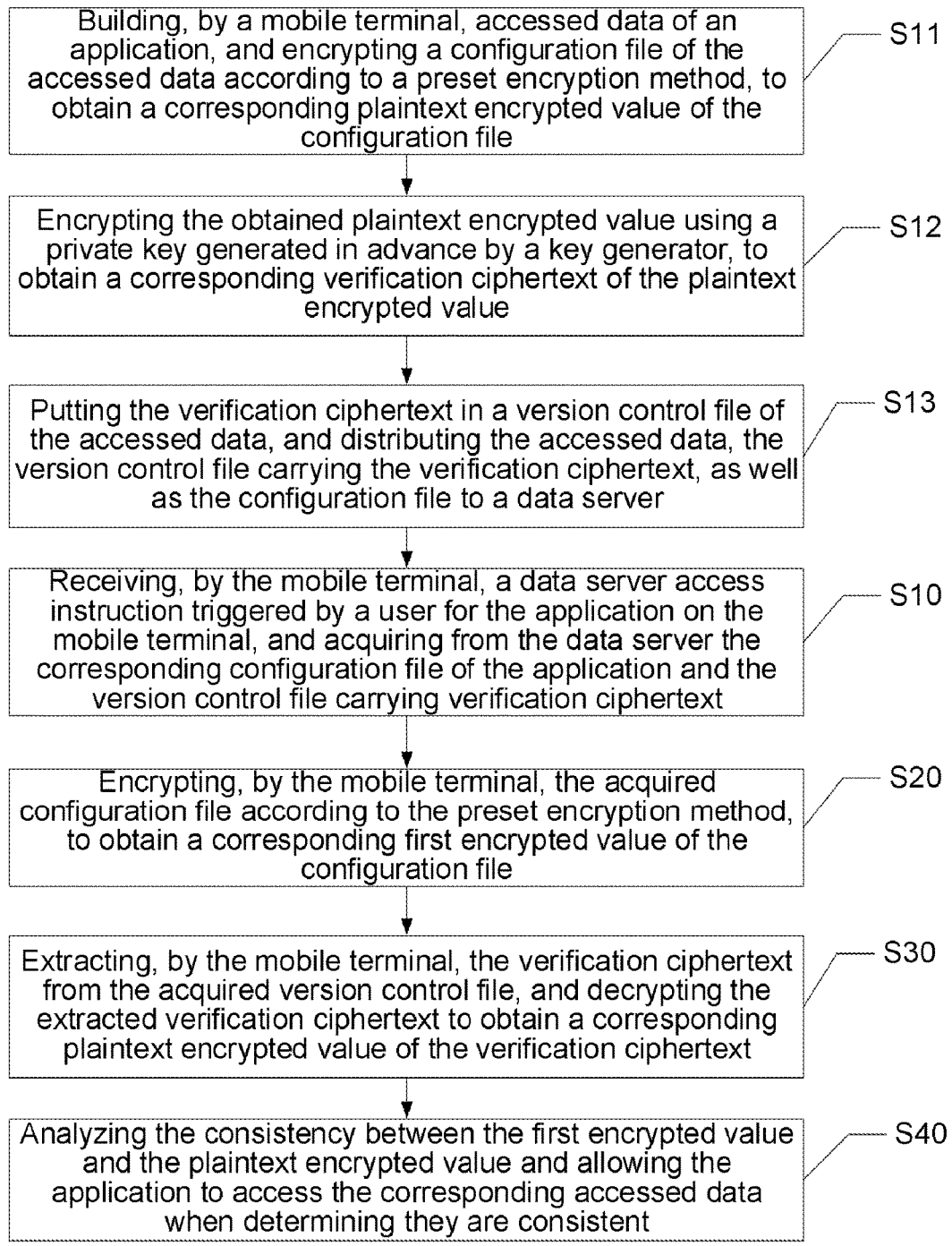
FIG. 6 is an illustrative flowchart of yet another embodiment of a method for preventing accessed data from being tampered with according to the disclosure.

The embodiment illustrated in FIG. 6 is a further illustrative example based on the embodiment shown in FIG. 4.

As illustrated in FIG. 6, the method of preventing accessed data from being tampered with according to the disclosure may further include steps S11-S13, prior to the step S10 "receiving, by a mobile terminal, a data server access instruction triggered by a user for an application on the mobile terminal, and acquiring from the data server a corresponding configuration file of the application and a version control file carrying verification ciphertext" shown in embodiment of FIG. 4.

In step S11, the mobile terminal builds accessed data of the application, and encrypting the configuration file of the accessed data according to the preset encryption method, so as to obtain the corresponding plaintext encrypted value of the configuration file.

In various embodiments, in building the accessed data of an application, the mobile terminal may directly encrypt the configuration file of the accessed data according to the preset encryption method, to obtain the corresponding plaintext encrypted value of the configuration file. The mobile terminal may use an encryption method, identical to the encryption method used to encrypt the corresponding configuration file of this application that is acquired by the mobile terminal, to encrypt the corresponding configuration file of the accessed data of the same application.

In a specific application scenario, for example, while building the browser's web page data, the webmaster's office terminal can use the MD5 encryption algorithm to perform MD5 processing on the configuration file, named manifest.json file, of the web page data, so as to obtain a corresponding second MD5 value of this configuration file.

At step S12, a private key generated in advance by a key generator is used to encrypt the obtained plaintext encrypted value, so as to obtain the corresponding verification ciphertext of the plaintext encrypted value.

That is, the mobile terminal can use the private key the key generator generated in advance to re-encrypt the plaintext encrypted value obtained by encrypting the corresponding configuration file of the aforesaid application. Thus, the corresponding verification ciphertext of the plaintext encrypted value is obtained.

In various embodiments, the key generator used by the mobile terminal is identical to that used by the mobile terminal for the same application; in addition, the private key used by the mobile terminal for encrypting the plaintext encrypted value is matched with the public key used by the mobile terminal for decrypting the verification ciphertext, as a matching key pair. For example, the mobile terminal may use a private key generated in advance by an RSA key generator to encrypt the obtained second MD5 value, to obtain the corresponding verification ciphertext of the second MD5 value.

At step S13, the verification ciphertext is put in the version control file of the accessed data, and the accessed data, the version control file carrying the verification ciphertext, as well as the configuration file are distributed to the data server.

In order to facilitate the mobile terminal in performing security check analysis on the accessed data to be currently accessed, the mobile terminal may put the encrypted verification ciphertext in the corresponding version control file of the accessed data, and further distribute all of the accessed data, the version control file carrying the verification ciphertext and the corresponding configuration file of the aforesaid application to the corresponding data server. For example, the mobile terminal may place the encrypted verification ciphertext in the version control file, named version.json file, of the browser's corresponding web page data, and further distribute the above web page data, the version.json file carrying the verification ciphertext and the browser's corresponding configuration file, manifest.json file, to the web server.

According to method of preventing accessed data from being tampered with of this disclosure, the mobile terminal can: build the accessed data of the application and encrypt the configuration file of the accessed data according to the preset encryption method to obtain the corresponding plaintext encrypted value of the configuration file; encrypt the obtained plaintext encrypted value using the private key generated in advance by the key generator, to obtain the corresponding verification ciphertext of the plaintext encrypted value; put the verification ciphertext in the version control file of the accessed data, and further distribute the accessed data, the version control file carrying the verification ciphertext, as well as the configuration file to the data server. Thus, the disclosure brings the benefit of encrypting the accessed data while building the accessed data, effectively preventing the security risks of the accessed data being tampered with after being built, thus further improving the security of the accessed data.

Figure 7:
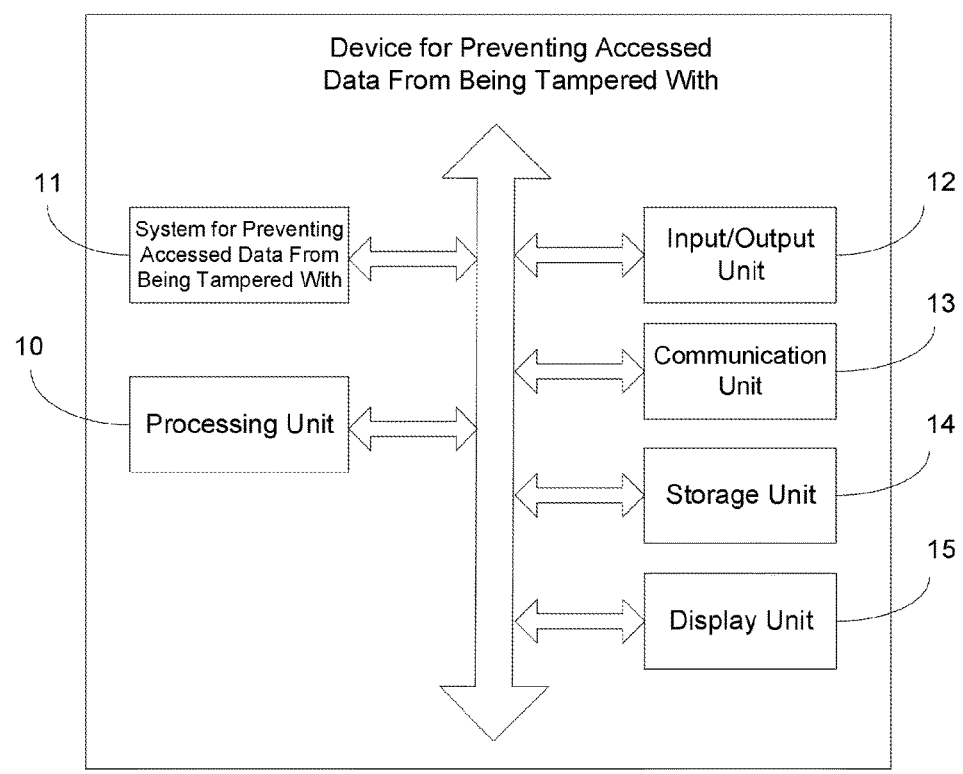
FIG. 7 is an illustrative hardware configuration diagram of a first embodiment of a device for preventing accessed data from being tampered with according to the disclosure.

As illustrated in FIG. 7, a hardware configuration diagram of a first embodiment of a device for preventing accessed data from being tampered with according to the disclosure is shown. In this embodiment, the device for preventing accessed data from being tampered with may include a processing unit 7, as well as a system 11 for preventing accessed data from being tampered with, an input/output unit 12, a communication unit 13, a storage unit 14, and a display unit 15 that are coupled to processing unit 10.

The input/output unit 12 may be one or more physical buttons and/or mice and/or joysticks, which is used for inputting a user instruction and outputting response data of the device for preventing accessed data from being accessed data to the input user instruction.

The communication unit 13 may be communicatively connected to a background server, e.g., a background data server providing accessed data for applications. The communication unit 13 may include a Wi-Fi module (thereby operative to communicate with the background server over the mobile Internet using the Wi-Fi module), a Bluetooth module (thereby operative to perform short range communications with a mobile phone through the Bluetooth module, and/or a GPRS module (thereby operative to communicate with the background server over the mobile Internet using the GPS module).

The storage unit 14 may include a storage space or a collection of a plurality of storage spaces for storing the system 11 for preventing accessed data from being tampered with as well as the operating data of the test system 11.

The display unit 15 is used for displaying a human-computer interaction interface for the user to input an instruction and for outputting and displaying the response data of the device for preventing accessed data from being tampered with to the user instruction, e.g., displaying a display prompting whether to allow the application to access the corresponding accessed data. Alternatively, the display unit 15 is used for displaying a reminder message to alert the user that the accessed data to be currently accessed is at risk of being tampered with.

The processor unit 10 is configured to execute the system for preventing accessed data from being tampered with, in order to cause the device to perform the following operations: receiving a data server access instruction triggered by a user for an application on the mobile terminal, and acquiring from the data server a corresponding configuration file of the application and a version control file carrying verification ciphertext; encrypting the acquired configuration file according to a preset encryption method to obtain a corresponding first encrypted value of the configuration file; extracting the verification ciphertext from the acquired version control file and decrypting the extracted verification ciphertext to obtain a corresponding plaintext encrypted value of the verification ciphertext; and analyzing the consistency between the first encrypted value and the plaintext encrypted value and allowing the application to access the corresponding accessed data.

The system 11 for preventing accessed data from being tampered with may consist of a series of program code or code instructions, which can be invoked and executed by processing unit 10 to perform the corresponding functions of the included program code or code instructions.

In an exemplary implementation, the processor unit 10 is configured to execute the system for preventing accessed data from being tampered with, in order to cause the device to perform the following operations: rejecting the application access to the corresponding accessed data when analyzing the first encrypted value and the plaintext encrypted value are consistent; or generating a reminder message to alert the user of the risk that the accessed data to be currently accessed may have been tampered with.

In an exemplary implementation, extracting the verification ciphertext and decrypting the extracted verification ciphertext may include: extracting the verification ciphertext from the version control file and decrypting the extracted verification ciphertext using a public key generated in advance by a key generator, to obtain the corresponding plaintext encrypted value of the verification ciphertext.

The public key is matched with a private key in the key pair to which the public key belongs, and the public key may be prestored in a corresponding preset type file of the application.

In an exemplary implementation, the processor unit 10 is configured to execute the system for preventing accessed data from being tampered with, in order to cause the device to perform the following operations: building accessed data of the application, and encrypting the configuration file of the accessed data according to a preset encryption method, so as to obtain the corresponding plaintext encrypted value of the configuration file; encrypting the obtained plaintext encrypted value using a private key generated in advance by a key generator, so as to obtain the corresponding verification ciphertext of the plaintext encrypted value; putting the verification ciphertext in the version control file of the accessed data, and distributing the accessed data, the version control file carrying the verification ciphertext, as well as the configuration file to the data server.

In an exemplary implementation, the preset encryption method includes a message digest algorithm.

Figure 8:
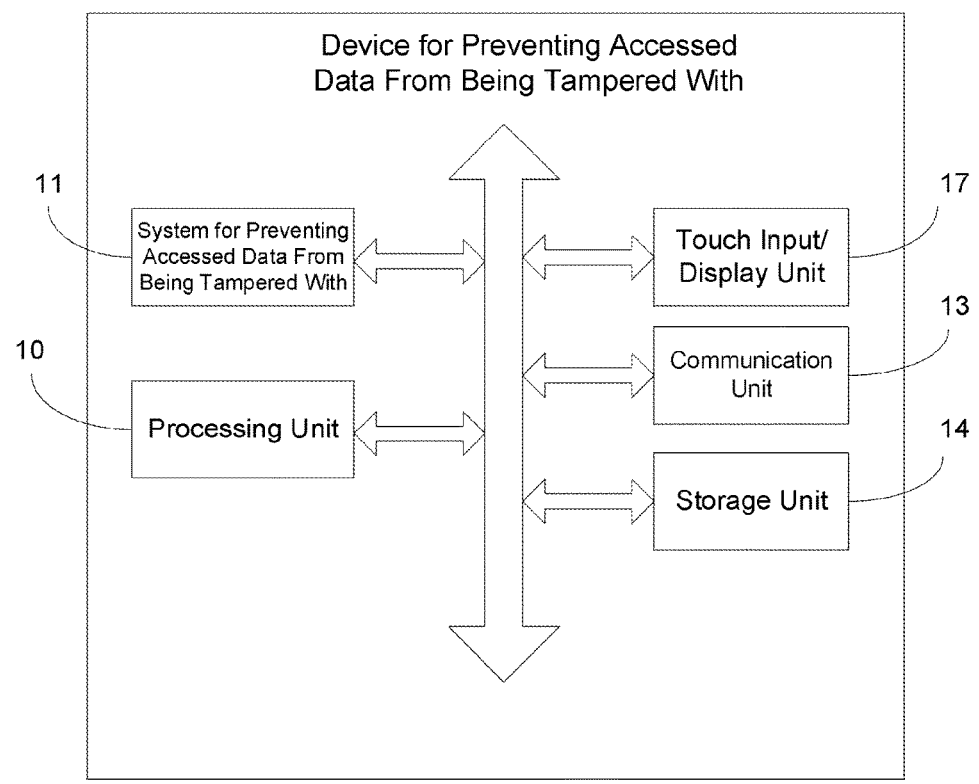
FIG. 8 is an illustrative hardware configuration diagram of a second embodiment of a device for preventing accessed data from being tampered with according to the disclosure.

As illustrated in FIG. 8, a hardware configuration diagram of a second embodiment of a device for preventing accessed data from being tampered with according to the disclosure is shown. In this embodiment, the device for preventing accessed data from being tampered with is substantially similar to that of the first embodiment, the major difference of which lies in that in this embodiment the input/output unit 12 and display unit 15 are replaced with a touch input/display unit 17.

The touch input/display unit 17 is used for providing a human-computer interaction interface for the user to input an instruction based on the human-computer interaction interface and for outputting and displaying the response data of the device for preventing accessed data from being tampered with to the user instruction. In this embodiment, the touch input/display unit 17 may include a touch input unit and a display unit. The touch input unit is used for receiving touch input in the touch sensing area of the human-computer interaction interface, while the display unit may be a display unit embedded with a touch panel. The human-computer interaction interface may include one or more virtual keys (not shown), which have the same functionality as the physical buttons described in the first embodiment of the disclosure, and so are not to be detailed herein. In addition, it will be appreciated that any physical key and/or mouse and/or joystick mentioned in the first embodiment can be replaced with virtual keys on the touch input/display unit 17.

This disclosure further provides a computer readable storage medium that stores one or more programs, which can be executed by one or more processors to perform the following operations: receiving a data server access instruction triggered by a user for an application on a mobile terminal, and acquiring from the data server a corresponding configuration file of the application and a version control file carrying verification ciphertext; encrypting the acquired configuration file according to a preset encryption method to obtain a corresponding first encrypted value of the configuration file; extracting from the acquired version control file the verification ciphertext and decrypting the extracted verification ciphertext to obtain a corresponding plaintext encrypted value of the verification ciphertext; and analyzing the consistency between the first encrypted value and the plaintext encrypted value and allowing the application to access the corresponding accessed data when determining the first encrypted value and the plaintext encrypted value are consistent.

In an exemplary implementation, the operations may further include: rejecting the application access to the corresponding accessed data when analyzing the first encrypted value and the plaintext encrypted value are inconsistent; or generating a reminder message to alert the user of the risk that the accessed data to be accessed may have been tampered with.

In an exemplary implementation, extracting the verification ciphertext and decrypting the extracted verification ciphertext may include: extracting the verification ciphertext from the version control file and decrypting the extracted verification ciphertext using a public key generated in advance by a key generator, to obtain the corresponding plaintext encrypted value of the verification ciphertext.

The public key is matched with a private key in the key pair to which the public key belongs, and the public key may be prestored in a corresponding preset type file of the application.

In an exemplary implementation, the operation may further include, prior to receiving the data server access instruction and acquiring the corresponding configuration file and the version control file: building accessed data of the application, and encrypting the configuration file of the accessed data according to the preset encryption method, so as to obtain the corresponding plaintext encrypted value of the configuration file; encrypting the obtained plaintext encrypted value using a private key generated in advance by a key generator, so as to obtain a corresponding verification ciphertext of the plaintext encrypted value; and putting the verification ciphertext in the version control file of the accessed data, and distributing the accessed data, the version control file carrying the verification ciphertext, as well as the configuration file to the data server.

In an exemplary implementation, the preset encryption method includes a message digest algorithm.

As used herein, the terms "including," "comprising," or any other non-exclusive terms are meant to state that processes, methods, articles, or systems including a series of elements will not only include those elements, other elements that haven't been explicitly listed or those elements inherent in such processes, methods, articles, or systems may also be included. In the absence of more restrictions, the element defined by the phrase "including/comprising a . . . " will not preclude the existence of additional such elements in the processes, methods, articles, or systems that include the element.

The above numbering of embodiments is intended for illustrative purposes only, and is not indicative of the pros and cons of these embodiments.

By the above description of various embodiments, it will be evident to those of skill art that the methods according to the above embodiments can be implemented by means of software plus the necessary general-purpose hardware platform; they can of course be implemented by hardware, but in many cases the former will be more advantageous. Based on such an understanding, the essential technical solution of the disclosure, or the portion that contributes to the prior art may be embodied as software products. Computer software products can be stored in a storage medium (e.g., a ROM/RAM, a magnetic disk, an optical disk) and may include multiple instructions that, when executed, can cause a computing device (e.g., a mobile phone, a computer, a server, a network device, etc.), to execute the methods as described in the various embodiments of the disclosure.

The foregoing description merely illustrates some exemplary embodiments of the disclosure and therefore is not intended as limiting the scope of the disclosure. Any equivalent configurational or flow transformations that are made taking advantage of the disclosure and that are used directly or indirectly in other related technical fields shall all fall in the scope of patent protection of the disclosure.

What is claimed is:

1. A method of preventing to-be-accessed data from being tampered with in an offline cache, comprising:
receiving, by a mobile terminal, a data server access instruction triggered by a user for a web-based application on the mobile terminal;
acquiring, from a data server, a corresponding configuration file of the web-based application and a version control file carrying a verification ciphertext in response to the data server access instruction before accessing the data server;
encrypting, by the mobile terminal, the acquired configuration file according to a preset encryption method to obtain a corresponding first encrypted value of the configuration file;
extracting, by the mobile terminal, the verification ciphertext from the acquired version control file and decrypting the extracted verification ciphertext to obtain a corresponding plaintext encrypted value of the verification ciphertext; and
analyzing, by the mobile terminal, whether the first encrypted value and the plaintext encrypted value are consistent or not, and allowing the web-based application to access the to-be-accessed data in response to determining that the first encrypted value and the plaintext encrypted value are consistent.

2. The method of claim 1, further comprising:
rejecting, by the mobile terminal, the web-based application access to the to-be-accessed data when an analyzing result is that the first encrypted value and the plaintext encrypted value are inconsistent; or generating a reminder message to alert the user that the to-be-accessed data is at a risk of being tampered with.

3. The method of claim 2, wherein extracting the verification ciphertext and decrypting the extracted verification ciphertext comprises:
extracting, by the mobile terminal, the verification ciphertext from the version control file and decrypting the extracted verification ciphertext using a public key generated in advance by a key generator, to obtain the corresponding plaintext encrypted value of the verification ciphertext, wherein the public key is matched with a private key in a key pair to which the public key belongs, and the public key is prestored in a corresponding preset type file of the web-based application.

4. The method of claim 3, further comprising, prior to receiving the data server access instruction and acquiring the corresponding configuration file and the version control file:
building, by the mobile terminal, the to-be-accessed data of the web-based application, and encrypting the configuration file of the to-be-accessed data according to the preset encryption method, to obtain the corresponding plaintext encrypted value of the configuration file;
encrypting the obtained plaintext encrypted value using the private key generated in advance by the key generator, to obtain the corresponding verification ciphertext of the plaintext encrypted value; and
putting the verification ciphertext in the version control file of the to-be-accessed data, and distributing the to-be-accessed data, the version control file carrying the verification ciphertext, as well as the configuration file to the data server.

5. The method of claim 1, wherein extracting the verification ciphertext and decrypting the extracted verification ciphertext comprises:
extracting, by the mobile terminal, the verification ciphertext from the version control file and decrypting the extracted verification ciphertext using a public key generated in advance by a key generator, to obtain the corresponding plaintext encrypted value of the verification ciphertext, wherein the public key is matched with a private key in a key pair to which the public key belongs, and the public key is prestored in a corresponding preset type file of the web-based application.

6. The method of claim 5, further comprising, prior to receiving the data server access instruction and acquiring the corresponding configuration file and the version control file:
building, by the mobile terminal, the to-be-accessed data of the web-based application, and encrypting the configuration file of the to-be-accessed data according to the preset encryption method, to obtain the corresponding plaintext encrypted value of the configuration file;
encrypting the obtained plaintext encrypted value using the private key generated in advance by the key generator, to obtain the corresponding verification ciphertext of the plaintext encrypted value; and
putting the verification ciphertext in the version control file of the to-be-accessed data, and distributing the to-be-accessed data, the version control file carrying the verification ciphertext, as well as the configuration file to the data server.

7. The method of claim 1, wherein the preset encryption method comprises a message digest algorithm.

8. A device for preventing to-be-accessed data from being tampered with in an offline cache, the device comprising a processing unit, as well as a system for preventing the to-be-accessed data from being tampered with, an input/output unit, a communication unit, and a storage unit that are coupled to the processing unit, wherein the input/output unit is configured for inputting a user instruction and outputting response data of the device for preventing the to-be-accessed data from being tampered with to the input user instruction; the communication unit is configured for a communicative connection with a mobile terminal or a background server; the storage unit is configured for storing the system for preventing the to-be-accessed data from being tampered with as well as operating data of the system; the processor unit is configured for executing the system for preventing the to-be-accessed data from being tampered with,
wherein, the device is configured for
receiving a data server access instruction triggered by a user for a web-based application, and acquiring from the data server a corresponding configuration file of the application and a version control file carrying verification ciphertext;
encrypting the acquired configuration file according to a preset encryption method to obtain a corresponding first encrypted value of the configuration file;
extracting from the acquired version control file the verification ciphertext and decrypting the extracted verification ciphertext to obtain a corresponding plaintext encrypted value of the verification ciphertext; and
analyzing whether the first encrypted value and the plaintext encrypted value are consistent or not and allowing the web-based application to access the to-be-accessed data in response to determining that the first encrypted value and the plaintext encrypted value are consistent.

9. The device of claim 8, wherein the processing unit is further configured for executing the system for preventing the to-be-accessed data from being tampered with to cause the device to perform the following operations:

rejecting the web-based application access to the to-be-accessed data when an analyzing result is that the first encrypted value and the plaintext encrypted value are inconsistent; or generating a reminder message to alert the user that the to-be-accessed data is at a risk of being tampered with.

10. The device of claim 8, wherein extracting the verification ciphertext and decrypting the extracted verification ciphertext comprises:

extracting the verification ciphertext from the version control file and decrypting the extracted verification ciphertext using a public key generated in advance by a key generator, to obtain the corresponding plaintext encrypted value of the verification ciphertext, wherein the public key is matched with a private key in a key pair to which the public key belongs, and the public key is prestored in a corresponding preset type file of the web-based application.

11. The device of claim 10, wherein the processing unit is further configured for executing the system for preventing the to-be-accessed data from being tampered with to cause the device to perform the following operations:

building the to-be-accessed data of the web-based application, and encrypting the configuration file of the to-be-accessed data according to the preset encryption method, to obtain the corresponding plaintext encrypted value of the configuration file;

encrypting the obtained plaintext encrypted value using the private key generated in advance by the key generator, to obtain the corresponding verification ciphertext of the plaintext encrypted value; and putting the verification ciphertext in the version control file of the to-be-accessed data, and distributing the to-be-accessed data, the version control file carrying the verification ciphertext, as well as the configuration file to the data server.

12. The device of claim 8, wherein the preset encryption method comprises a message digest algorithm.

\* \* \* \* \*